United States Patent [19]

Osawa et al.

[11] Patent Number: 5,512,899
[45] Date of Patent: Apr. 30, 1996

[54] METHOD OF EVALUATING THE IMAGE QUALITY OF A SYNTHETIC APERTURE RADAR

[75] Inventors: Yuji Osawa; Toshihiro Sezai, both of Tokyo, Japan

[73] Assignee: National Space Development Agency of Japan, Tokyo, Japan

[21] Appl. No.: 390,221

[22] Filed: Feb. 16, 1995

[30] Foreign Application Priority Data

Mar. 8, 1994 [JP] Japan .................................. 6-062156

[51] Int. Cl.⁶ .................................................. G01S 13/90
[52] U.S. Cl. .............................. 342/25; 342/43; 342/191
[58] Field of Search .............................. 342/25, 43, 182, 342/191, 165

[56] References Cited

U.S. PATENT DOCUMENTS

| 4,450,447 | 5/1984 | Zebker et al. | 434/2 |
| 4,786,906 | 11/1988 | Krogager | 342/25 |

FOREIGN PATENT DOCUMENTS

| 3248879 | 4/1984 | Germany. |
| 3315499 | 2/1987 | Germany. |
| 61-038580 | 2/1986 | Japan. |

OTHER PUBLICATIONS

IEICE Transactions on Communications, vol. E75–B, No. 8, Aug. 1992, Tokyo JP pp. 791–793. M. Fujita 'An active reflector for SAR calibration having a frequency shift capability'.

10th Annual International Geoscience & Remote Sensing Symposium, vol. 1, May 1990, Washington US. pp. 795–798. P. S. Daleman et al. 'Experience with active radar calibrators for airborne SAR'.

IEEE Antennas and Propagation Society International Symposium, 28 Jun. 1993, Michigan US. pp. 1280–1283 J. J. Ahne et al. 'Design and implementation of single antenna polarimetric active radar calibrators'.

IEEE Transactions on Microwave Theory and Techniques, vol. 40, No. 6, 1992, New York US. pp. 1063–1069. H. D. Jackson et al. 'Development of the ERS–1 active radar calibration unit'.

Patent Abstracts of Japan vol. 10, No. 195 (P–475) (2251) 9 Jul. 1986.

Primary Examiner—Daniel T. Pihulic
Attorney, Agent, or Firm—Armstrong, Westerman, Hattori, McLeland & Naughton

[57] ABSTRACT

An active reflector including an antenna, a frequency converter, and a delay circuit is placed at a location within an area to be detected by a synthetic aperture radar. The active reflector receives an incoming radio wave emitted by the synthetic aperture radar and changes its frequency or delay time. The resultant radio wave is transmitted as a reflected radio wave toward the synthetic aperture radar. As a result, the position of the active reflector image displayed on the screen of the synthetic aperture radar is shifted. The ambiguity is quantitatively detected from the pixel value at the original display position at which the active reflector image was displayed before it was shifted, thereby evaluating the image quality of the synthetic aperture radar.

14 Claims, 4 Drawing Sheets

FLIGHT DIRECTION →

METHOD OF EVALUATING THE IMAGE QUALITY OF A SYNTHETIC APERTURE RADAR

BACKGROUND OF THE INVENTION

1. Field of the Invention

The present invention relates to a method of evaluating the image quality of a synthetic aperture radar, and more specifically, to a method of accurately and quantitatively evaluating the quality of an image formed by a synthetic aperture radar.

2. Description of Related Art

In synthetic aperture radars, as is well known in the art, an antenna having a virtually large aperture is formed using an antenna having a rather small aperture. In this technique, an image radar (side-looking radar) is installed on a flight object (platform) such as an artificial satellite or an aircraft, and a radio wave is emitted by the image radar, as the flight object is moving, toward the ground in a lateral direction relative to the flight object. The image radar receives reflected radio waves as it moves, and performs synthetic aperture processing on the received radio waves in such a manner that an image equivalent to that obtained via a large-aperture antenna can be obtained. Such a synthetic aperture radar is used as an image sensor that can provide a high-resolution image under all-weather conditions.

Figure 1:
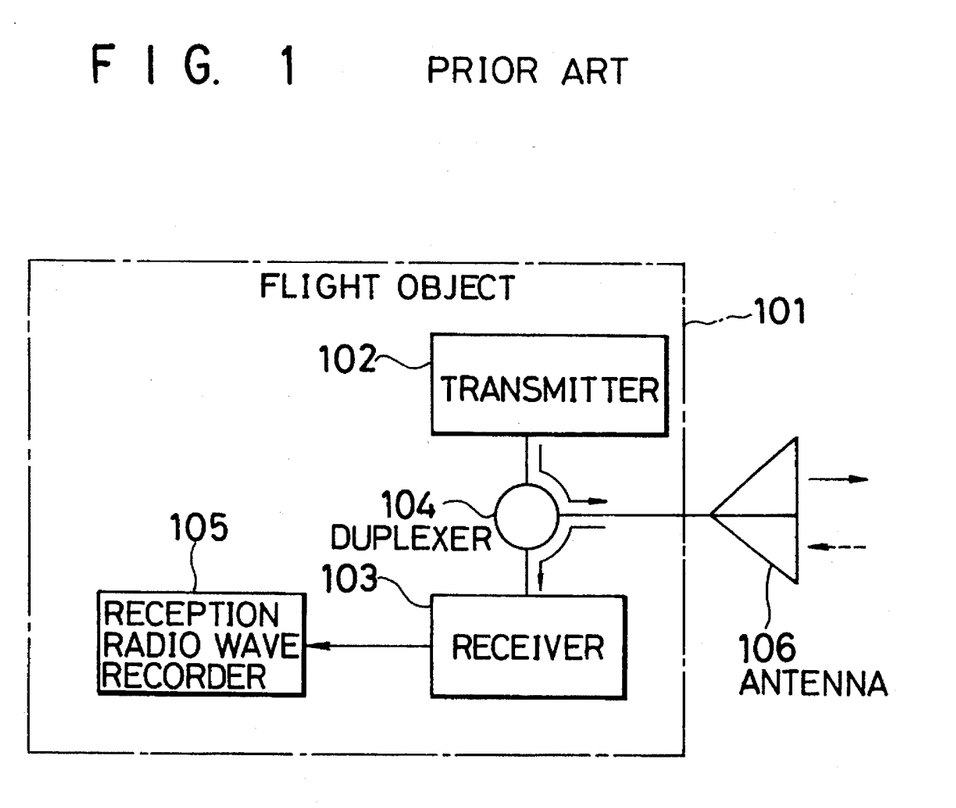
FIG. 1 is a schematic diagram illustrating the construction of a typical synthetic aperture radar.

FIG. 1 is a schematic diagram illustrating the construction of a typical synthetic aperture radar. In FIG. 1, there are shown a flight object (platform) 101 such as an artificial satellite or an aircraft, a transmitter 102 installed on this flight object, a receiver 103, a duplexer 104, a reception radio wave recorder 105 for recording radio waves received via the receiver 103, and an antenna 106.

Figure 2:
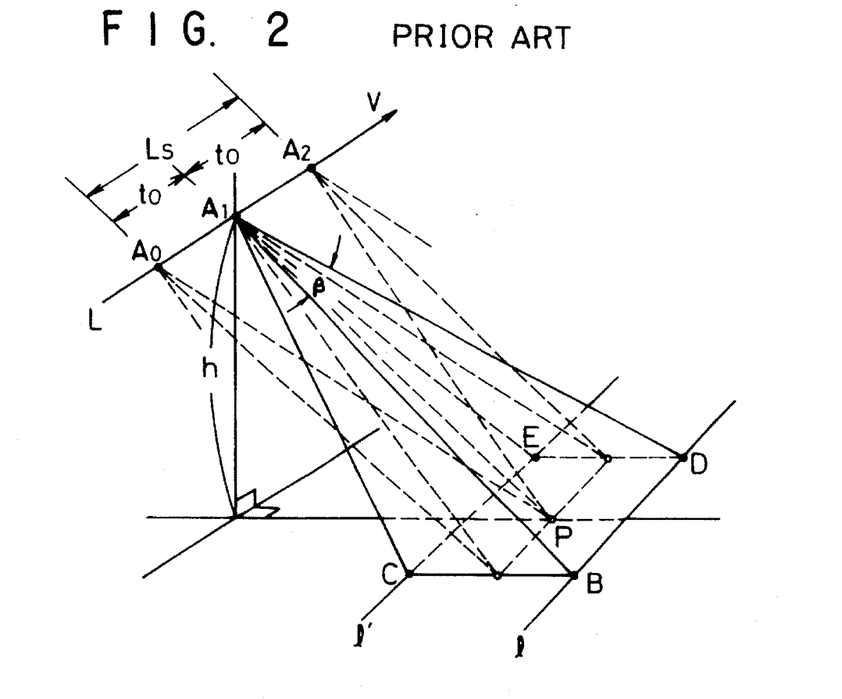
FIG. 2 is a schematic diagram illustrating the operation principle of the synthetic aperture radar shown in FIG. 1.

Referring to FIG. 2, the operation principle of the synthetic aperture radar constructed with these elements will be described below. The flight object 101 such as an artificial satellite travels at a speed V along an air route or orbit L predetermined depending on a specific purpose. The small-aperture antenna 106 of the synthetic aperture radar installed on the flight object 101 emits transmission radio wave pulses at constant time intervals to at positions $A_0, A_1, A_2, \ldots$ along the orbit L at a height h. The transmission radio wave pulse in the form of a beam with a width $\beta$ is emitted in a direction perpendicular to the orbit L, and it strikes, for example, an area BCED on the ground at a point $A_1$. The transmission radio wave pulse is reflected from the ground, travels backward as a reflected wave (radar echo), and is finally received by the same antenna 106.

Reflected waves are received one after another during the flight object 101 moving at the speed V thereby observing a ground area between parallel lines l and l' a distance BC apart and thus recording, in the reception radio wave recorder 105, amplitude information as well as phase information contained in the received signal obtained at each temporal point. If a transmission pulse wave that was emitted by the flight object 101 when it was, for example, at the point $A_0$, has arrived at a target point P to be detected, then the irradiation of the pulse wave to the target point P starts and the target point P will receive further radiation until it finally receives a pulse wave emitted by the flight object 101 at the point $A_2$. The radio waves reflected from the target point P during this period are received by the flight object 101. The received radio waves include phase information corresponding to the relative velocity that varies continuously as well as distance information. The received signals are recorded and subjected later to batch processing (holographic processing or synthetic aperture processing) whereby the antenna can act as if it has a great aperture diameter equal to the distance between points $A_0$ and $A_2$ (synthetic aperture method).

As described above, signals are received successively at various points and recorded. The received signals are then synthesized such that the antenna can detect a target as if it has a great aperture size a few ten to few ten thousand times the actual aperture size of the antenna. This means that the synthetic aperture radar can have high azimuth resolution and thus can provide a clear image that would be obtained via the equivalent large-aperture antenna.

Figure 3:
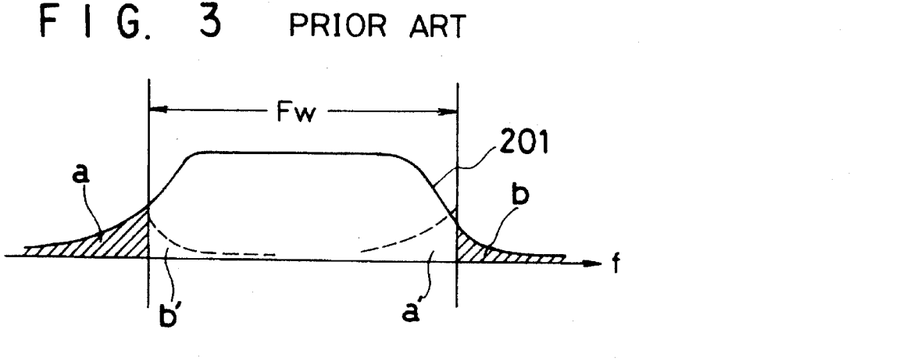
FIG. 3 is a schematic representation of azimuth ambiguity components scattered into an processing frequency band of a reception signal spectrum associated with a synthetic aperture radar.

The received signal (echo signal) 201 also contains a small amount of undesirable components reflected from areas other than an area to be detected, as represented by a and b in FIG. 3. When the signal is subjected to Fourier transformation in holographic processing, folding occurs in the frequency spectrum of the signal. As a result, the above-described undesirable signal components are scattered into a processing spectrum band Fw of the received signal, as represented by a' and b' in FIG. 3. Such an undesirable echo signal reflected from a non-targeted area is referred to as azimuth ambiguity. An undesirable echo signal can also be caused by an echo signal of a transmission pulse one or more pulses earlier or one or more pulses later than a transmission pulse of interest. In this case, the undesirable echo signal is referred to as range ambiguity. If these ambiguity components become great relative to the primary signal, the resultant image becomes unclear.

From the above point of view, the image quality of a synthetic aperture radar can be evaluated using a signal S and ambiguity A, for example, by the ratio of S to A (S/A). In synthetic aperture radars, the image of an object to be detected is produced, in general, according to the steps including a step of receiving, via an antenna, a radio wave reflected from the object to be detected, and a step of performing synthetic aperture processing on the received signal data thereby producing a corresponding image. Although the data received via the antenna includes not only a signal S but also ambiguity A due to the properties of the antenna pattern and the repetition period of pulses, the ambiguity A is reduced and the signal S is enhanced by performing synthetic aperture processing on the received signal data. In principle, this processing, however, makes it is impossible to reduce the ambiguity to zero and thus there is still some residual ambiguity. It is required to evaluate the ambiguity A accurately in a quantitative fashion.

Figure 4:
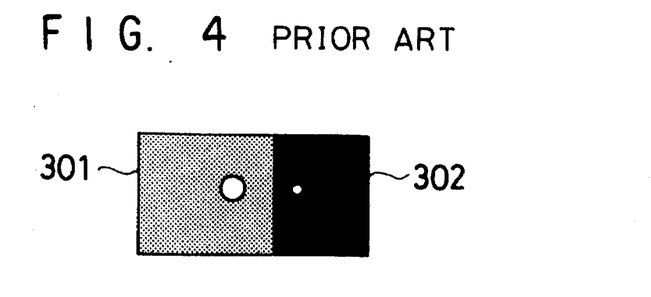
FIG. 4 is a schematic diagram illustrating a conventional method of evaluating image quality on the basis of a ratio S/A.

However, no one has succeeded in developing a method of quantitatively evaluating the ambiguity. Conventional techniques for evaluating the quality of an image formed by a synthetic aperture radar is based on the evaluation of the ratio S/A rather than the ambiguity itself. FIG. 4 illustrates an example of a conventional evaluation technique. A virtual image of a target represented by an open circle (o) in a bright area (land area for example) 301 on the left side of FIG. 4 is formed in a dark area (sea area for example) 302 adjacent to the bright area, as represented by an open circle (o). The virtual image is evaluated according to a visual impression of a human operator and the image quality is determined using the image values of the virtual image and the area around it.

In the above described conventional technique, however, the image quality is determined from the ratio S/A that is determined according to visual impressions of a human operator, and therefore it is impossible to quantitatively evaluate the ambiguity A. Besides, this technique can be applied only to a special image including both bright and dark areas adjacent to each other. Furthermore, although the ratio S/A depends not only on the component in a horizontal (azimuth) direction (that is, in the flight direction) but also on the component in vertical (range) direction, only the component either in the azimuth direction or in the range direction is taken into account in the above technique as shown in FIG. 3. Moreover, visual evaluation by human eyes is not reliable enough.

SUMMARY OF THE INVENTION

It is an object of the present invention to solve the above problems in the conventional technique for evaluating the image quality of a synthetic aperture radar. More specifically, it is an object of the present invention to provide a method of accurately and quantitatively evaluating the image quality of a synthetic aperture radar.

The above objects are achieved by the present invention having various aspects and features described below. According to a first aspect of the present invention, there is provided a method of evaluating the quality of an image formed by a synthetic aperture radar, the method including: a step of placing an active reflector at a location within an area to be detected by the synthetic aperture radar, the active reflector having the capability of receiving an incoming radio wave emitted by the synthetic aperture radar, changing the amplitude, frequency, and delay time of the received radio wave, and transmitting the resultant radio wave as a reflected radio wave, the characteristics of the active reflector being known beforehand; an active reflector image position shifting step in which the active reflector receives an incoming radio wave emitted by the synthetic aperture radar, changing a characteristic or characteristics of the received radio wave from the original characteristics of the incoming radio wave coming from the synthetic aperture radar, and returning back the resultant radio wave as a reflected radio wave, thereby shifting the display position of the image of the active reflector from its original display position on a display screen of the synthetic aperture radar; and a step of evaluating the quality of the image formed by the synthetic aperture radar by detecting the ambiguity quantitatively from the pixel value obtained at the original display position on the display screen at which the image of the active reflector was displayed before it was shifted.

In conventional techniques, an active reflector is used to calibrate the synthetic aperture radar system. The active reflector is placed at a location within an area to be observed by the synthetic aperture radar. When the active reflector receives a radio wave emitted by the synthetic aperture radar, it changes the amplitude, frequency, and delay time of the received radio wave and returns the resultant radio wave toward the synthetic aperture radar. The calibration regarding the brightness of the synthetic aperture radar is performed by varying the amplitude of the radio wave returned back from the active reflector thereby varying the brightness of the image of the active reflector displayed on the image screen of the synthetic aperture radar. Similarly, the calibration regarding the image position of the synthetic aperture radar is performed by changing the frequency or the delay time of the reflected radio wave thereby changing the image position of the active reflector.

Figure 5A:
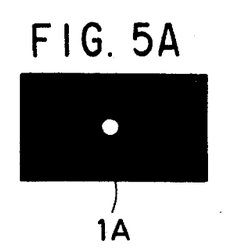
FIG. 5 is a schematic diagram illustrating various modes of shifting an active reflector image displayed on a screen of a synthetic aperture radar wherein the image shifting occurs as a function of the frequency offset and the delay time given by an active reflector.
Figure 5B:
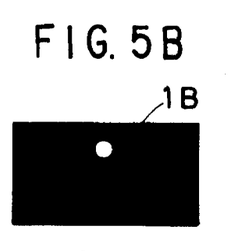
Figure 5C:
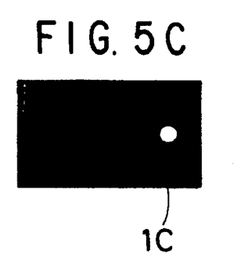
Figure 5D:
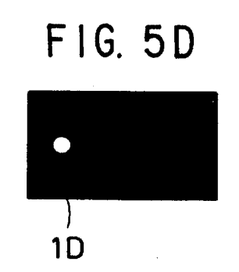

In conversion of data received by the synthetic aperture radar to an image by performing synthetic aperture processing, the coordinate in the range direction is determined from the difference in data acquisition time corresponding to the difference in distance between the radar and a target, and the coordinate in the azimuth direction is determined from the frequency shift due to the Doppler effect. Therefore, if the delay time of the radio wave returned back from the active reflector is changed within limits in which the image of the active reflector is still within the screen area of the synthetic aperture radar, then the image of the active reflector displayed at the screen position denoted by the open circle 1A in FIG. 5A shifts outward in the range direction as represented by the open circle 1B in FIG. 5B. On the other hand, if the frequency of the radio wave returned back from the active reflector is increased within limits of the Doppler frequency bandwidth corresponding to the beam width of the antenna of the synthetic aperture radar, then the image position of the active reflector shifts in an azimuth direction corresponding to the flight direction of the synthetic aperture radar as represented by the open circle 1C in FIG. 5C. In the contrary case where the frequency of the radio wave returned back from the active reflector is decreased within limits of the Doppler frequency bandwidth corresponding to the beam width of the radar antenna, the image position of the active reflector shifts in the opposite azimuth direction that is opposite to the flight direction of the synthetic aperture radar, as represented by the open circle 1D in FIG. 5D. In this way, the brightness and the image position of synthetic aperture radars can be calibrated using an active reflector according to the conventional calibration method.

In this invention, the image quality is evaluated using the above calibration technique for synthetic aperture radars. If a characteristic such as the frequency or the delay time of an active reflector serving as a calibration means is changed, the image of the active reflector shifts from the original display position corresponding to the actual location of the active reflector, and thus no image must be displayed at the original display position corresponding to the actual location of the active reflector. In practice however, the antenna pattern, the pulse repetition period, or the property of synthetic aperture processing can cause some signal to be displayed at the pixel position corresponding to the above original display position at which the image of the active reflector was displayed before it was shifted. In the above-described first aspect of the present invention, some characteristic of the radio wave returned back from the active reflector is changed so as to shift the display position of the image of the active reflector. In the state in which the active reflector image is shifted, the signal S coming from the active reflector is displayed at a pixel location different from the original location, and thus the signal that appears at the original display position at which the image of the active reflector was displayed before it was shifted can be considered to represent the ambiguity A of the signal S. Therefore, it is possible to accurately and quantitatively evaluate only the ambiguity A by evaluating the signal at the pixel position at which the image of the active reflector was displayed before it was shifted.

According to a second aspect based on the first aspect of the present invention, there is provided a method of evaluating the quality of an image formed by a synthetic aperture radar, in which the frequency of the reflected radio wave returning back from the active reflector is changed from its original value. In this method, the position of the image of the active reflector displayed on the display screen is shifted, and the ambiguity A is detected quantitatively from the pixel value obtained at the position at which the image of the active reflector was displayed before it was shifted.

According to a third aspect based on the first aspect of the present invention, there is provided a method of evaluating the quality of an image formed by a synthetic aperture radar, in which the frequency of the reflected radio wave returning back from the active reflector is changed from the frequency of the incoming radio wave by an integral multiple of the Doppler frequency bandwidth corresponding to the beam width of the antenna of the synthetic aperture radar. In this method, the position of the image of the active reflector displayed on the display screen is shifted such that the shifted image appears at the original display position, and thus the ambiguity A is detected quantitatively from the pixel value obtained at the original display position.

According to a fourth aspect based on the first aspect of the present invention, there is provided a method of evaluating the quality of an image formed by a synthetic aperture radar, in which the delay time of the reflected radio wave returned back from the active reflector is changed from its original value. In this method, the position of the image of the active reflector displayed on the display screen is shifted, and the ambiguity A is detected quantitatively from the pixel value obtained at the position at which the image of the active reflector was displayed before it was shifted.

According to a fifth aspect based on the first aspect of the present invention, there is provided a method of evaluating the quality of an image formed by a synthetic aperture radar, in which the delay time of the reflected radio wave returned back from the active reflector is set to an integral multiple of the pulse repetition period of the radio wave emitted by the synthetic aperture radar. In this method, the position of the image of the active reflector displayed on the display screen is shifted such that the shifted image appears at the original display position, and thus the ambiguity A is detected quantitatively from the pixel value obtained at the original display position.

According to a sixth aspect based on the first aspect of the present invention, there is provided a method of evaluating the quality of an image formed by a synthetic aperture radar, in which the frequency and the delay time of the reflected radio wave returned back from the active reflector is changed from the original values. In this method, the position of the image of the active reflector displayed on the display screen is shifted in a slanted direction and the ambiguity A is detected quantitatively from the pixel value obtained at the position at which the image of the active reflector was displayed before it was shifted.

According to a seventh aspect based on the first aspect of the present invention, there is provided a method of evaluating the quality of an image formed by a synthetic aperture radar, in which the frequency of the reflected radio wave returned back from the active reflector is changed from the original frequency of the incoming radio wave by an integral multiple of the Doppler frequency bandwidth corresponding to the beam width of the antenna of the synthetic aperture radar, and furthermore the delay time of the reflected radio wave returned back from the active reflector is set to an integral multiple of the pulse repetition period of the radio wave emitted by the synthetic aperture radar. In this method, the position of the image of the active reflector displayed on the display screen is shifted such that the shifted image appears at the original display position, and thus the ambiguity A is detected quantitatively from the pixel value obtained at the original display position.

In eighth through fourteenth aspects based on the above-described first through seventh aspects of the present invention, respectively, the antenna of the active reflector is adapted to have an effective area that will be displayed as an image having a size greater than the size of one pixel on the display screen of the synthetic aperture radar. In these methods, the pixel value at the original display position at which the image of the active reflector was displayed before it was shifted does not include signal components at all positions other than an ambiguity component and thus it is possible to perform more accurate detection of ambiguity.

DESCRIPTION OF THE PREFERRED EMBODIMENTS

Preferred embodiments of the invention will be described below.

Figure 6:
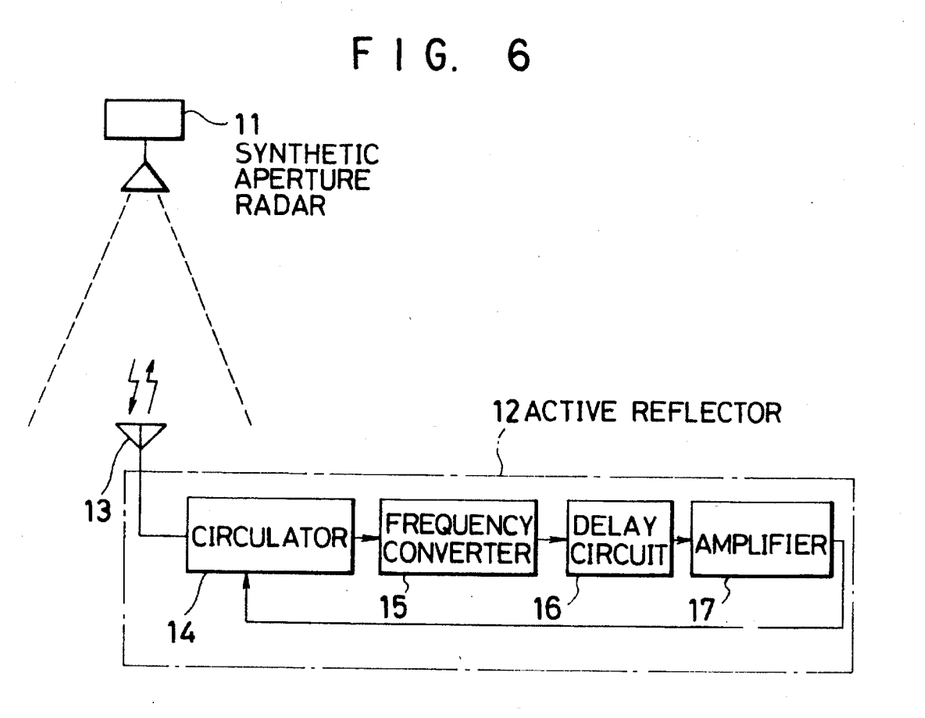
FIG. 6 is a schematic diagram illustrating an embodiment of a method of evaluating the quality of an image produced by a synthetic aperture radar, according to the present invention.

FIG. 6 is a schematic diagram illustrating an embodiment of a method of evaluating the quality of an image formed by a synthetic aperture radar, according to the present invention. In FIG. 6, reference numeral 11 denotes a synthetic aperture radar, and reference numeral 12 denotes an active reflector placed at a location in an area to be observed by the synthetic aperture radar 11. Reference numeral 13 denotes an antenna of the active reflector 12 for receiving a radio wave emitted by the synthetic aperture radar 11 and returning a reflection radio wave back to the synthetic aperture radar after processing the received radio wave. An arbitrary type of antenna such as dipole antenna, a horn antenna, etc., can be employed as the antenna 13. Reference numeral 14 denotes a circulator for transferring a received radio wave to a frequency converter 15 and transferring a reflection radio wave that has been subjected to processing to the antenna 13. The frequency converter 15 is used to convert the frequency of the received radio wave to a different frequency. Reference numeral 16 denotes a delay circuit by which the received radio wave is delayed by an arbitrary amount before returning it as a reflected radio wave. Reference numeral 17 denotes an amplifier for amplifying the power of the received radio wave to a desired power level. The active reflector 12 is composed of these elements described above wherein each element can be constructed according to known techniques.

As described earlier, it is known in the art that an active reflector 12 is placed at a location in an area to be detected by a synthetic aperture radar 11 so as to calibrate the synthetic aperture radar. According to a report regarding an experiment of calibration of the synthetic aperture radar AMI installed on the artificial satellite launched by European Space Agency in 1991, if a frequency offset f (Hz) is given by an active reflector, then the image displayed on the screen of the synthetic aperture radar will be shifted by an amount of 3.2 f (m).

If the frequency of a reflected radio wave is offset using the above-described calibration technique thereby shifting the display position of the image of an active reflector from its original display position, then only ambiguity A is indicated at the original display position. Therefore, it is possible to quantitatively evaluate the ambiguity A of the image quality of the image produced by the synthetic aperture radar by evaluating the pixel value obtained at the original display position.

The ambiguity A depends mainly on the antenna pattern, the pulse repetition period, and the synthetic aperture processing. The direct influence of a target to be detected on the ambiguity A is very little, and thus it can be considered that there is little difference in ambiguity A among adjacent pixels. This means that the value of the ambiguity A obtained at the original display position after the image of the active reflector has been shifted can be considered to be equal to the value of the ambiguity A at adjacent pixels. Since both signal and ambiguity (S+A) appear at a pixel adjacent to the original display position of the active reflector image, it is possible to determine the ratio S/A from the pixel value (S+A) and the pixel value A at the original display position of the active reflector image. Thus, the evaluation method described above can also be applied to evaluation in a conventional fashion. In this case, the result will be more accurate and more quantitative.

Figure 7A:
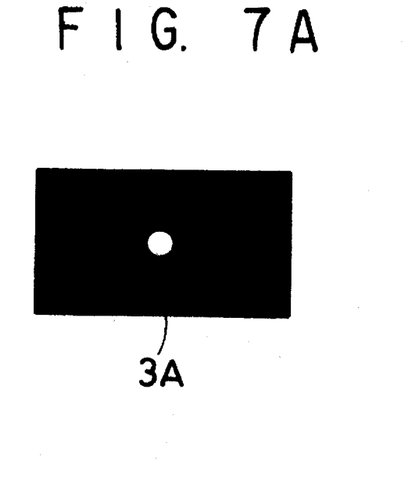
FIG. 7 is a schematic diagram illustrating a mode of shifting an active reflector image, that will occur when a frequency shift given by an active reflector is greater than the Doppler frequency bandwidth corresponding to the beam width of a radar antenna.
Figure 7B:
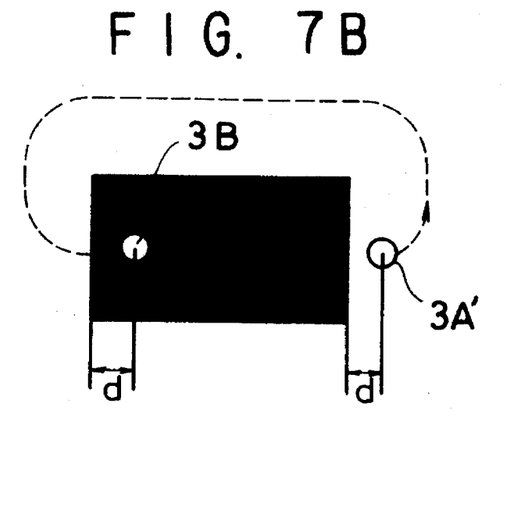

If the active reflector increases the frequency of a reflected radio wave greatly from that of an incoming radio wave, the image 3A displayed at the original display position (denoted by the open circle) shown in FIG. 7A is shifted in the flight direction of the synthetic aperture radar (to the right) beyond the boundary of the display screen as represented by the circle 3A' in FIG. 7B. However, the image comes again into the screen area via the opposite side (left side) of the display screen to a location that is apart from the left side by an amount equal to the excess distance d from the screen boundary (right side). This is because the width of the display screen area in the azimuth direction corresponds to the beam width of the radar antenna. Although the image should not appear at such a position on the display screen, the synthetic aperture processing essentially causes the image to appear at such the position. Therefore, if the frequency of the reflected radio wave is increased from its original value by an amount equal to the Doppler frequency bandwidth corresponding to the beam width of the radar antenna, then the shifted image will be displayed at the original display position at which the image was displayed before it was shifted. In the case where the frequency is decreased from its original value by an amount equal to the Doppler frequency bandwidth corresponding to the beam width of the radar antenna, the shifted image will also be displayed at the original display position at which the image was displayed before it was shifted.

As can be seen from the above discussion, if the frequency is shifted from its original value by an amount equal to an integral multiple of the Doppler frequency bandwidth corresponding to the beam width of the radar antenna, the shifted image will be displayed at 'the original display position at which the image was displayed before it was shifted. When the image of the active reflector is displayed at the original display position as a result of the frequency shift in the reflected radio wave returned back from the active reflector, the pixel value at that position does not include a signal component while it includes only an ambiguity component corresponding to the frequency shift, because the image appears there owing to the synthetic aperture processing and thus this image is not an actual image that should be displayed at that position. The value of the ambiguity component detected according to this embodiment is much greater than that obtained in the first embodiment described above.

As described above, if the frequency of the reflected radio wave is shifted by the active reflector by the amount described above, the active reflector image appears at the original display position on the display screen of the synthetic aperture radar. Because the characteristics of the reflected radio wave are known, the pixel value of the image that is indicated on the screen when there is no shift in the frequency is also known. Therefore, it is possible to quantitatively determine only the ambiguity due to the synthetic aperture processing, by evaluating the pixel value of the active reflector image that is displayed at the original display position when there is a shift in the frequency.

In the case of the synthetic aperture radar SAR installed on the artificial satellite that was launched by National Space Development Agency of Japan in 1992, the Doppler frequency bandwidth in the synthetic aperture processing is set to 1200 Hz. Therefore, if the frequency shift f given by the active reflector is set to an integral multiple of 1200 Hz, then the active reflector image is displayed at the original display position, and thus it is possible to quantitatively evaluate the ambiguity of the image quality by evaluating the pixel value obtained at that position.

Now, a third embodiment of the present invention will be described. In this embodiment, data acquired by the synthetic aperture radar is converted into an image by the synthetic aperture processing, while maintaining the delay time given by the active reflector within limits in which the active reflector image can remain inside the display screen. In this case, the image position is shifted outward from its original display position in the range direction. Therefore, only the ambiguity A is displayed at the original display position as in the case where the frequency is shifted, and thus it is possible to quantitatively evaluate the image quality regarding the ambiguity A of the synthetic aperture radar by evaluating the pixel value obtained at that position.

Figure 8:
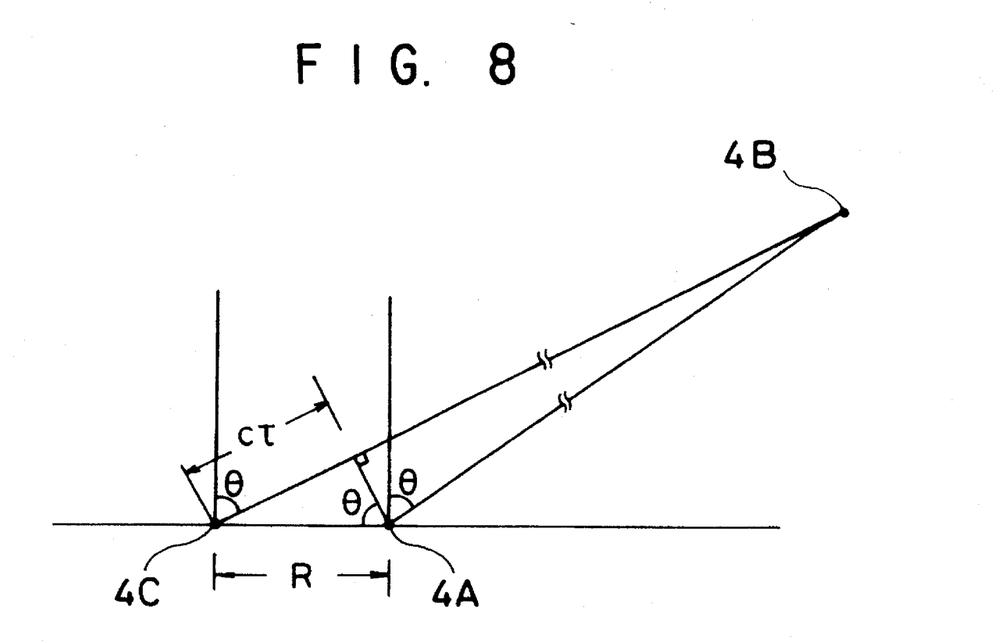
FIG. 8 is a schematic diagram illustrating a mode of shifting an active reflector image, that will occur when a reflection radio wave returned back from an active reflector is delayed.

As shown in FIG. 8, when a radio wave emitted by the synthetic aperture radar 4B is incident at an angle θ on the active reflector 4A placed at a location within an area to be detected, if the delay time given by a delay circuit of the active reflector 4A is set to τ (s), then the image of the active reflector 4A is shifted outward on the display screen in the range direction by an amount equal to cτ/sin θ (m) where c denotes the propagation velocity of the radio wave expressed in m/s. If it is assumed that the distance between 'the active reflector 4A and a point 4C at the upper limit of the detectable range is R (m), and the delay time is set to a value in the range less than R.sin θ/c (s) and greater than a value at which the shifted image is displayed at the original display position of the non-shifted image (this value corresponds to the distance between two adjacent pixels), then the pixel value at the original display position at which the active reflector image was displayed before it was shifted represents a pure value of the ambiguity A. Therefore, it is possible to quantitatively evaluate the ambiguity of the image by evaluating the pixel value.

A fourth embodiment will be described below. In the third embodiment described above, if the delay time of a reflected radio wave given by the active reflector is set to a value equal to an integral multiple of the repetition period of pulse waves emitted by the synthetic aperture radar, then the reflected radio wave is returned back from the active reflector with a time delay in which a few pulse waves having no time delay would have been returned, and thus the synthetic aperture radar receives the reflected radio wave from the active reflector superimposed on another radio wave that has returned back after being reflected from an object at another location (different from the location where the active reflector is placed). As a result, the active reflector image is displayed at the original display position on the display screen at which the image cannot appear unless the reflected radio wave was delayed, which causes degradation in the image quality. This image is unavoidable in the synthetic aperture processing as in the case where the frequency is shifted, and therefore the pixel value at the original display position includes only an ambiguity component corresponding to the time delay and does not include a signal component. The ambiguity component is much greater than that obtained in the third embodiment described above. As described above, the characteristics of the radio wave reflected back from the active reflector are known, and therefore the pixel value of the image that is obtained when there is no time delay is also known. Thus, it is possible to quantitatively determine only the ambiguity due to the synthetic aperture processing by evaluating the pixel value of the active reflector image that appears at the original display position when the delay is introduced in the above-described manner.

When the pulse repetition period of pulse waves emitted by the synthetic aperture radar is T (s), if the delay time given by the delay circuit is set to nT (s) (n is an integer), then the delayed active reflector image is displayed at the original display position and thus it is possible to quantitatively determine the ambiguity of the image quality by evaluating the pixel value at that position.

Now, a fifth embodiment of the present invention will be described below. In this embodiment, in the conversion of data acquired by the synthetic aperture radar into an image by means of the synthetic aperture processing, the frequency of the radio wave reflected back from the active reflector is shifted and furthermore the radio wave is returned back after a time delay within limits in which the active reflector image can remain inside the display screen. As a result, the active reflector image is displayed at a location shifted in a slanted direction from its original display position. As in the first or third embodiment in which the frequency or the delay time is changed, only ambiguity A is indicated at the original display position, and thus it is possible to quantitatively determine the ambiguity A of the image produced by the synthetic aperture radar by evaluating the pixel value at the original display position.

A sixth embodiment of the present invention will be described below. In the fifth embodiment described above, if the frequency and the delay time of the radio wave reflected by the active reflector are changed in such a manner that the frequency shift is set to a value equal to an integral multiple of the Doppler frequency bandwidth corresponding to the beam width of the radar antenna, and the delay time is set to an integral multiple of the repetition period of the pulse waves emitted by the synthetic aperture radar, then the active reflector image is displayed at its original display position as in the second or fourth embodiment. Also in this case as in the second or fourth embodiment, the image appears there owing to the synthetic aperture processing, and thus the pixel value includes only an ambiguity component corresponding to the frequency shift and the delay time, and does not include a signal component. Therefore, it is possible to quantitatively detect only ambiguity by evaluating the pixel value of the active reflector that appears at the original display position when the above-described frequency shift and the time delay are given.

When the data obtained by the synthetic aperture processing is converted into an image in the synthetic aperture radar, the output data is given for each pixel. Therefore, the effective area of the antenna of the active reflector should be large enough to cover at least one pixel. Although the pixel size of the synthetic aperture radar is fixed, the position of the pixel in the object to be detected is not necessarily fixed because there are variations in the orbit and attitude of the synthetic aperture radar. Taking into account the above factors, the effective area of the antenna of the active reflector should be determined so that the effective area can cover one pixel. If the effective area of the antenna of the active reflector is determined such that the size in the azimuth direction is equal to or greater than twice the size of one pixel in the azimuth direction, and the size in the range direction is equal to or greater than twice the size of one pixel in the range direction, one pixel is always covered by the effective area of the antenna. If the size of the active reflector is determined in the above-described manner, and if the frequency or the delay time is changed thereby shifting the active reflector image on the radar screen such that one or more pixel value including the active reflector image are all shifted to different pixels, then the pixel at the original display position at which the active reflector image was displayed before it was shifted includes only the ambiguity A and does not include the signal at all and thus it is possible to accurately detect the ambiguity.

In the case where the effective area of the antenna of the active reflector does not cover the whole of one pixel, the signal reflected from the active reflector is much greater than signals contained in the pixel coming from objects other than the active reflector. Therefore, although it is impossible to quantitatively evaluate accurate ambiguity A in this case, it is possible to evaluate the image quality more accurately than the conventional technique based on the ratio S/A.

As described above referring to specific embodiments, the present invention provides an accurate and quantitative evaluation method of the quality of an image produced by the synthetic aperture radar, in which an active reflector, that is used usually in the calibration of the synthetic aperture radar, is used here to shift the active reflector image on the display screen of the synthetic aperture radar from its original display position, and the ambiguity is detected from the pixel value at the original display position.

What is claimed is:

1. A method of evaluating the quality of an image formed by a synthetic aperture radar comprising the steps of:

placing an active reflector at a location within an area to be detected by the synthetic aperture radar, said active reflector having the capability of receiving an incoming radio wave emitted by the synthetic aperture radar, changing the amplitude, frequency, and delay time of the received radio wave, and transmitting the resultant radio wave as a reflected radio wave, the characteristics of said active reflector being predetermined;

shifting a position of an image produced by said active reflector in which said active reflector receives an incoming radio wave emitted by said synthetic aperture radar, a characteristic or characteristics of the received radio wave are changed from the original characteristics of the incoming radio wave coming from said synthetic aperture radar, and the resultant radio wave is returned back as a reflected radio wave, thereby shifting the display position of the image of said active reflector from its original display position on a display screen of said synthetic aperture radar; and evaluating the quality of the image formed by the synthetic aperture radar by quantitatively detecting the ambiguity from the pixel value obtained at said original display position on the display screen at which the image of said active reflector was displayed before it was shifted.

2. A method of evaluating the quality of an image formed by a synthetic aperture radar according to claim 1, wherein in said shifting step, the changing of a characteristic or characteristics of the received radio wave from the original characteristics of the incoming radio wave coming from said synthetic aperture radar is accomplished by shifting the frequency of the reflected radio wave that is to be returned back after arriving at said active reflector from the frequency of the incoming radio wave coming from said synthetic aperture radar by an amount within the Doppler frequency bandwidth corresponding to the beam width of the antenna of the synthetic aperture radar.

3. A method of evaluating the quality of an image formed by a synthetic aperture radar according to claim 1, wherein in said shifting step, the changing of a characteristic or characteristics of the received radio wave from the original characteristics of the incoming radio wave coming from said synthetic aperture radar is accomplished by shifting the frequency of the reflected radio wave that is to be returned back after arriving at said active reflector from the frequency of the incoming radio wave coming from said synthetic aperture radar by an amount equal to an integral multiple of the Doppler frequency bandwidth corresponding to the beam width of the antenna of the synthetic aperture radar.

4. A method of evaluating the quality of an image formed by a synthetic aperture radar according to claim 1, wherein in said shifting step, the changing of a characteristic or characteristics of the received radio wave from the original characteristics of the incoming radio wave coming from said synthetic aperture radar is accomplished by setting the delay time of the reflected radio wave that is to be returned back after arriving at said active reflector to a value within limits in which the active reflector image still remains inside the screen area when it is shifted from its original display position.

5. A method of evaluating the quality of an image formed by a synthetic aperture radar according to claim 1, wherein in said shifting step, the changing of a characteristic or characteristics of the received radio wave from the original characteristics of the incoming radio wave coming from said synthetic aperture radar is accomplished by setting the delay time of the reflected radio wave that is to be returned back after arriving at said active reflector to a value equal to an integral multiple of the repetition period of the pulse waves emitted by the synthetic aperture radar.

6. A method of evaluating the quality of an image formed by a synthetic aperture radar according to claim 1, wherein in said shifting step, the changing of a characteristic or characteristics of the received radio wave from the original characteristics of the incoming radio wave coming from said synthetic aperture radar is accomplished by shifting the frequency of the reflected radio wave that is to be returned back after arriving at said active reflector from the frequency of the incoming radio wave coming from said synthetic aperture radar by an amount within the Doppler frequency bandwidth corresponding to the beam width of the antenna of the synthetic aperture radar, and further setting the delay time of the reflected radio wave that is to be returned back to a value within limits in which the active reflector image still remains inside the screen area when it is shifted from its original display position.

7. A method of evaluating the quality of an image formed by a synthetic aperture radar according to claim 1, wherein in said shifting step, the changing of a characteristic or characteristics of the received radio wave from the original characteristics of the incoming radio wave coming from said synthetic aperture radar is accomplished by shifting the frequency of the reflected radio wave that is to be returned back after arriving at said active reflector from the frequency of the incoming radio wave coming from said synthetic aperture radar by an amount equal to an integral multiple of the Doppler frequency bandwidth corresponding to the beam width of the antenna of the synthetic aperture radar and further setting the delay time of the reflected radio wave that is to be returned back from said active reflector to a value equal to an integral multiple of the repetition period of the pulse waves emitted by the synthetic aperture radar.

8. A method of evaluating the quality of an image formed by a synthetic aperture radar according to claim 1, wherein said active reflector is provided with an antenna having an effective area which results in an image size greater than the size of one pixel when displayed on the display screen of the synthetic aperture radar.

9. A method of evaluating the quality of an image formed by a synthetic aperture radar according to claim 2, wherein said active reflector is provided with an antenna having an effective area which results in an image size greater than the size of one pixel when displayed on the display screen of the synthetic aperture radar.

10. A method of evaluating the quality of an image formed by a synthetic aperture radar according to claim 3, wherein said active reflector is provided with an antenna having an effective area which results in an image size greater than the size of one pixel when displayed on the display screen of the synthetic aperture radar.

11. A method of evaluating the quality of an image formed by a synthetic aperture radar according to claim 4, wherein said active reflector is provided with an antenna having an effective area which results in an image size greater than the size of one pixel when displayed on the display screen of the synthetic aperture radar.

12. A method of evaluating the quality of an image formed by a synthetic aperture radar according to claim 5, wherein said active reflector is provided with an antenna having an effective area which results in an image size greater than the size of one pixel when displayed on the display screen of the synthetic aperture radar.

13. A method of evaluating the quality of an image formed by a synthetic aperture radar according to claim 6, wherein said active reflector is provided with an antenna having an effective area which results in an image size greater than the size of one pixel when displayed on the display screen of the synthetic aperture radar.

14. A method of evaluating the quality of an image formed by a synthetic aperture radar according to claim 7, wherein said active reflector is provided with an antenna having an effective area which results in an image size greater than the size of one pixel when displayed on the display screen of the synthetic aperture radar.

* * * * *